US006957257B1

(12) United States Patent
Buffalo et al.

(10) Patent No.: US 6,957,257 B1
(45) Date of Patent: Oct. 18, 2005

(54) CUSTOMER SERVICE MAINTENANCE AUTOMATION

(75) Inventors: Clarence W. Buffalo, Ashburn, VA (US); Frances Centofante, Tinton Falls, NJ (US); Chin-Wang Chao, Lincroft, NJ (US); Brian T. Hou, Freehold, NJ (US); Christian P. Kolmodin, Mountainside, NJ (US); Shu-Chih Lin, Marlboro, NJ (US); Elliot P. Olschwang, Red Bank, NJ (US); Fernando Teixeira, Middletown, NJ (US)

(73) Assignee: AT&T Corp., New York, NY (US)

( * ) Notice: Subject to any disclaimer, the term of this patent is extended or adjusted under 35 U.S.C. 154(b) by 906 days.

(21) Appl. No.: 09/649,974

(22) Filed: Aug. 29, 2000

(51) Int. Cl.[7] ...................... G06F 15/173; G06F 15/16; G06F 11/00
(52) U.S. Cl. ........................ 709/224; 709/200; 714/25
(58) Field of Search ............................... 709/224, 223, 709/217, 200; 714/4, 25; 379/9, 9.03, 10.01

(56) References Cited

U.S. PATENT DOCUMENTS

| | | | | |
|---|---|---|---|---|
| 5,946,372 A | * | 8/1999 | Jones et al. | ............... 379/10.01 |
| 6,032,184 A | * | 2/2000 | Cogger et al. | ............... 709/223 |
| 6,445,774 B1 | * | 9/2002 | Kidder et al. | ............... 379/9.03 |
| 6,449,341 B1 | * | 9/2002 | Adams et al. | .................. 379/9 |
| 6,513,129 B1 | * | 1/2003 | Tentij et al. | .................... 714/4 |
| 6,631,402 B1 | * | 10/2003 | Devine et al. | .............. 709/217 |

* cited by examiner

Primary Examiner—John Follansbee
Assistant Examiner—Philip Lee (57) ABSTRACT

The present invention provides a method and system for automatically providing infrastructure maintenance for a customer in response to a customer form/report/ticket in a communications network that includes a core communications (voice and data communications) service and an Access Provider service. Typically, the system includes a Work-Flow Manager and a maintenance program scheduler. The Work-Flow Manager is arranged to trigger, for each customer form/report/ticket, each automatic software program/engine of a plurality of automatic software programs/engines in response to an associated milestone event for the customer form/report/ticket. The maintenance program scheduler is coupled to the Work-Flow Manager and is used for invoking at least one predetermined maintenance software program based upon predetermined criteria being met by the form/report/ticket. The method includes the steps of: generating a ticket/customer repair request regarding a problem; diagnosing the problem; testing to determine whether the problem has been fixed; generating clearance and analysis codes; notifying the customer that the system has repaired the problem; and closing out the ticket/repair request upon successful repair of the problem.

21 Claims, 3 Drawing Sheets

CUSTOMER SERVICE MAINTENANCE AUTOMATION

FIELD OF THE INVENTION

The present invention relates generally to automatic customer service maintenance in a communications network, and more particularly to automatic customer service maintenance in a communications network that includes a core communications service as well as an access provider service.

BACKGROUND OF THE INVENTION

Communications networks have evolved to provide a communication path for data as well as voice, escalating service demand. While these voice and data networks are highly reliable, service failures can occur. In some instances, the workforce to handle the service failures has declined, causing more repair work per capita for workforce employees. Previous solutions have added hardware and software maintenance features to the voice and data communication services to simplify determining the cause of a failure. Software has been developed that allows a technician to locate an operation failure in a circuit. However, frequently such software is not readily upgradeable. Alarm systems have also been used to notify personnel that the service has failed.

Though the above solutions have proved helpful, previous systems for customer maintenance have typically utilized at least partial manual operation, which has inhibited speedy repair of faulty communication systems. As networks have expanded and numbers of users have grown, a need has developed for a more efficient customer maintenance system that automatically troubleshoots communication problems and reduces the mean time to repair (MTTR) the communication dysfunction/nonfunction.

SUMMARY OF THE INVENTION

The present invention provides a customer maintenance system for automatically providing infrastructure maintenance in response to a customer form/report/ticket in a communications network that includes a core communications service and an access provider service. The system includes a Work-Flow Manager that is arranged to trigger, for each customer form/report/ticket, each of a plurality of automatic software programs in response to an associated milestone event for the customer form/report/ticket and a Maintenance Program Scheduler that is coupled to the Work-Flow Manager and is used for invoking at least one predetermined maintenance software program/engine based upon predetermined criteria being met by the form/report/ticket. The predetermined criteria are typically time-based, i.e., the software programs (such as an automatic progress reporting program, which determines when status is owed to the customer and an automatic closing program which checks for tickets that have been "turned-up" to the customer) are set to run at predetermined times to check for failures in the infrastructure of the communications network. The plurality of automatic software programs may include: an automatic diagnosing program, an automatic linking program, an automatic notification program, an automatic referral program, an automatic preparation for clearing program, an automatic progress reporting program, an automatic verification program, an automatic customer notification program, and an automatic closing program.

The automatic diagnosing program is triggered when the customer form/report/ticket is received by the automatic customer maintenance system. The automatic linking program then determines whether the problem reported by the customer is caused by a higher level facility or equipment problem and, if so, correlates a ticket for the higher level facility/equipment problem with the ticket for the customer. The automatic notification program sends the ticket to a maintenance technician when the automatic diagnosing program indicates that the problem requires further analysis. Alternatively, when the automatic diagnosing program indicates that the problem lies in Access Provider's portion of the circuit, the automatic referral program automatically sends an electronic referral of the problem to the Access Provider via a gateway. The automatic verification program tests the circuits and performs alarm checks to determine if the problem has been fixed by the Access Provider or the maintenance technician. When the test indicates that the circuit has been repaired by the maintenance technician or the Access Provider, the automatic preparation for clearing program populates clearance information and analysis codes on the ticket based on the diagnosis conclusion or disposition code sent by the Access Provider. The automatic progress reporting program automatically telephones the customer to give a status report, or may be set up to email the status or to leave a message on an answering machine for the client. The automatic customer notification program may provide the customer with direct Web access to view and receive permission to close or concur that the trouble has been fixed (i.e., referred to as the ticket being "turned-up" to the customer) or may provide an interactive voice response system that calls the customer for status and/or updating. The automatic closing program automatically closes tickets that have been successfully "turned-up" to the customer.

Typically, problems in the core communications service may be tracked using a customer gateway for Web access that is coupled to a data communication network of the communications network. Another gateway, coupled to the Business Maintenance Platform that encompasses the plurality of automatic customer maintenance software programs, is generally used to communicate with the Access Provider.

The customer form/report/ticket may be initiated by the customer using Web access or may be initiated by an agent in a Custom Care Platform that is coupled to a data communication network. The customer form/report/ticket is then sent to a Business Maintenance Platform for processing in accordance with at least the automatic software programs.

The Business Maintenance Platform may include a Database (A Managed Object (MO) Unit) for storing information on the data circuits and customer information, a Ticket Unit that includes a Maintenance Program Scheduler and is used for processing the customer form/report/ticket, a Test Unit for testing a selected infrastructure portion of the communications network, an Alarm Unit for recording problems that the system detects in the network, and an Event Unit having a Work-Flow Manager and a plurality of computer programs/engines, wherein the Event Unit is used for monitoring events and initiating activities based on events.

Generally, the Business Maintenance Platform automatically provides infrastructure maintenance in response to a customer form/report/ticket in a communications network. The Business Maintenance Platform is typically coupled in parallel to a data communication network, Service Provisioning Systems, a Work Management System, Network Management Systems, a Billing System, and a Gateway to an Access Provider (AP).

The present invention may be implemented as a method for automatically providing infrastructure maintenance in response to a customer form/report/ticket in a communications network that includes a voice and data service. The method includes the steps of: generating a ticket/customer repair request regarding a problem; diagnosing the problem; testing to determine whether the problem has been fixed; generating clearance and analysis codes; notifying the customer that the system has repaired the problem; and closing out the ticket/repair request upon successful repair of the problem. Generating a ticket/customer repair request regarding a problem is typically accomplished by a customer or by an agent of a Customer Care Platform wherein the agent confers with the customer and is then transmitted to a Business Maintenance Platform for automatic infrastructure maintenance processing. Diagnosing the problem is generally accomplished by an automatic diagnosing program and an automatic linking program. Testing to determine whether the problem has been fixed is typically accomplished by an automatic verification program. Generating clearance and analysis codes is generally accomplished by an automatic preparation for clearing program. Notifying the customer that the system has repaired the problem is typically accomplished by an automatic customer notification program that displays a circuit trouble description to the customer via e-maintenance, a web-based system that provides customers direct access to view/update their trouble ticket, and by an Interactive Voice Response system. Closing out the ticket/repair request upon successful repair of the problem is then accomplished by an automatic closing program. The automatic notification program may be utilized any time a technician desires to use it. For example, the automatic notification program may be utilized when a trouble ticket is sent to a maintenance technician as soon as the problem is diagnosed and the problem is determined to be a telephone service problem, a core communications network problem or a problem that requires manual intervention. An automatic referral program may be utilized to automatically send an electronic referral to the Access Provider (AP) via a gateway using a common interface with the AP based on the ISO/OSI seven layer communication protocol and the ANSI TIMI.227 and 228 trouble administration standard when the trouble ticket indicates that the problem lies with the Access Provider Service. An automatic progress reporting program may be utilized to implement an Interactive Voice Response system that automatically phones the customer periodically and informs him/her/an answering machine of the current status of his/her ticket and may be arranged to allow the customer to update the status schedule. An automatic verification program may be utilized to run tests and perform alarm checks to determine if an Access Provider has fixed the problem that is being reported as cleared or if a manual intervention has occurred to solve the problem.

DETAILED DESCRIPTION OF THE PREFERRED EMBODIMENTS

The present invention enables customer service maintenance trouble requests to flow through the isolation, repair and turn-up processes without human intervention. Prior to the present invention, trouble requests sometimes endured a quiescent period before a technician had the opportunity to address the problem in the trouble request. However, since the present invention substantially automates the repair process, the maintenance cycle time is decreased, creating greater customer satisfaction and encouraging customers to utilize a communication system that implements this invention.

The present invention provides a Business Maintenance Platform (BMP) that facilitates reporting, problem isolation, repair, and reporting to the customer without manual intervention. While the present invention generally automates the customer service maintenance process, there may be instances in which manual intervention is required. However, in such instances, the present invention provides for obtaining information that typically allows non-technical people to resolve the problem.

Figure 1:
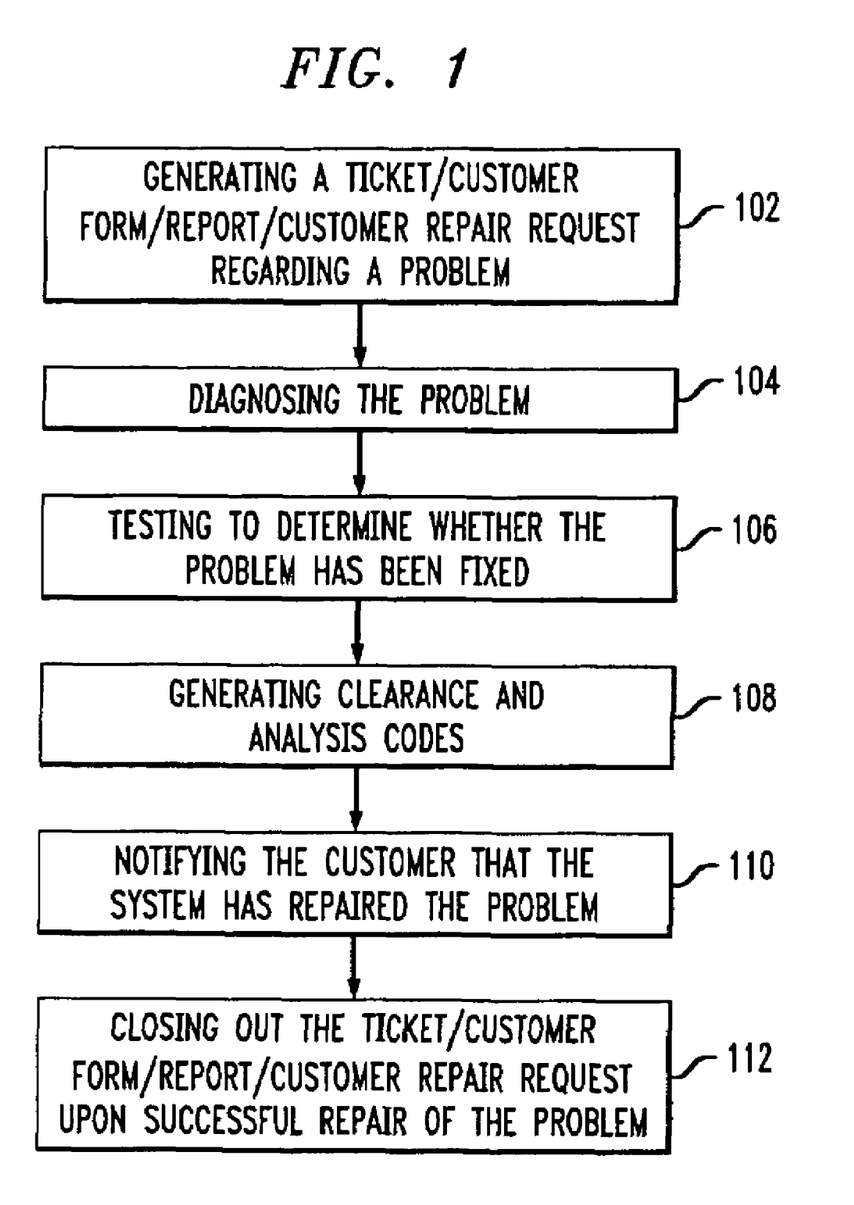
FIG. 1 is a flow chart of one embodiment of steps in accordance with the method of the present invention.

As shown in FIG. 1, the BMP typically provides for at least six steps to be implemented: 1) generating a "ticket" or customer repair request regarding a problem (Step 102); 2) diagnosing the problem (Step 104); 3) testing to determine whether the problem has been fixed (Step 106); 4) generating clearance and analysis codes (Step 108); 5) notifying the customer that the system has repaired the problem (Step 110); and 6) closing out 112 the "ticket"/repair request upon successful repair of the problem (Step 112).

Generating a ticket/customer repair request regarding a problem during Step 102 generally may be accomplished by a customer, may be achieved using a phone via an Interactive Voice Response (IVR) system or, alternatively, by an agent of a Customer Care Platform; the repair request is then transmitted to a Business Maintenance Platform for automatic infrastructure maintenance processing. Other software maintenance programs are named in the description for the method, and their operations are described more fully below. Diagnosing the problem during Step 104 is typically accomplished by an automatic diagnosing program and an automatic linking program. Testing to determine whether the problem has been fixed during Step 106 is typically accomplished by an automatic verification program. Generating clearance and analysis codes during Step 108 may be accomplished by an automatic preparation for clearing program. Notifying the customer that the system has repaired the problem during Step 110 is generally accomplished by an automatic customer notification program that either displays clearance information to a web user or phones the customer with the clearance information. Closing out the ticket/repair request upon successful repair of the problem during Step 112 may be accomplished by an automatic closing program.

The automatic notification program may be utilized any time a technician or expert needs to be involved, e.g., when a trouble ticket is sent to a maintenance technician as soon as the problem is diagnosed as a telephone service/core communication network problem that requires manual intervention. Alternatively, the automatic referral program may be utilized to automatically send an electronic referral to the Access Provider (AP) via a gateway using a common interface with the AP based on ISO/OSI seven layer communication protocol and a ANSI TIMI.227 and 228 trouble administration standard when the trouble ticket indicates that the problem lies with the Access Provider service. The automatic progress reporting program may be utilized to implement an Interactive Voice Response system that automatically phones the customer periodically and informs him/her/an answering machine of the current status of his/her ticket. The automatic verification program may be utilized to run tests and perform alarm checks to determine if an Access Provider has fixed the problem that is being reported as cleared or a manual intervention has occurred to solve the problem.

The present invention may be initiated manually or automatically. In manual initiation, the customer may notify a service representative that he/she has a communication problem. The service representative then fills out a repair form/ticket and sends the form/ticket to the BMP. Alternatively, in automatic initiation, the customer may access a Web site and fill out a form/ticket that describes the communication problem and transmits the form/ticket to the BMP. As an additional maintenance procedure, the present invention may be initiated by software that periodically checks predetermined communication areas to determine whether service is needed, and where repair is needed, automatically generates a form/ticket and sends the form/ticket to the BMP.

Upon receiving the form/ticket, the BMP automatically initiates a predetermined diagnosing scheme (automatic diagnosing) that analyzes alarm data collected from the communication network, automates a predetermined series of tests, and analyzes the results of the tests to isolate the customer's circuit trouble. A non-technical Customer Interface (CI) agent may run complex tests at a touch of a button or, alternatively, the tests may be automatically triggered by the BMP. The CI agent provides a non-technical synopsis of the trouble. This non-technical synopsis may be used by the CI agent or, upon being reported to the customer in the form/ticket, may be used by the customer to speed the trouble resolution process. The CI agent may inform the customer of possible premises equipment problems directly, or alternatively may be programmed to call the customer and leave a message. Typically, when the CI agent informs the customer directly, the CI agent provides the non-technical synopsis in writing in a predetermined area on the form/ticket and sends the completed form to the customer. Also, in the diagnosis, an automatic linking program determines whether the problem reported by the customer is actually caused by a higher level facility or equipment problem, and if so, generates a second ticket reporting the problem for the facility/equipment and sets a relationship between the first ticket and the second ticket so that the first ticket, i.e., the customer ticket, is automatically updated whenever the second ticket, i.e., the facility/equipment ticket, is updated.

Upon completing the diagnosis, where the problem has been isolated to reside in the Access Provider's portion of the circuit, the automatic referral program automatically sends an electronic referral to the Access Provider (AP) via a gateway using a common interface with the AP based on the ISO/OSI seven layer communication protocol and the ANSI TIMI.227 and 228 trouble administration standard, which are known to those skilled in the art, and will not be discussed further here. Where the problem has been determined to reside in the core network portion of the circuit or is diagnosed as a problem that requires manual intervention by a technician/service representative, an automatic notification program automatically sends a trouble ticket to a maintenance technician.

Also, upon completion of diagnosis, an automatic referral program sends an electronic message to the Access Provider informing them that the Customer Care agent accepts the AP's closure after verifying that the circuit is working properly. An automatic preparation for clearing program automatically pre-populates clearance information on the ticket after the diagnosis has detected one of the following conditions: (1) a Test OK; (2) a customer's premises equipment (CPE) problem; or (3) the diagnosis has detected that the automatic verification has determined that the Access Provider has fixed the circuit. Clearance and analysis codes are populated based on the diagnosis or the disposition code returned from the Access Provider.

Where desired, the diagnosis procedure may also include an automatic progress reporting program that implements an Interactive Voice Response (IVR) system that automatically phones the customer periodically and informs him/her of the current status of his/her ticket. The IVR system may be arranged to interact with either a live person or an answering machine.

Next, the Access Provider typically requests closing out of the ticket, triggering an automatic verification program to run tests and perform alarm checks to determine if the Access Provider has actually fixed the problem that is being reported as cleared to the BMP, or if the circuit impaired, for example by a cable cut, has been successfully restored. Upon completion of execution of the automatic verification program, if a circuit is identified as faulty, a trouble ticket is sent to a maintenance technician. Then, the automatic preparation for clearing program automatically pre-populates the clearance information as described above.

When the automatic preparation for clearing program has completed execution, an automatic customer notification program displays the circuit trouble description to the customer via e-maintenance, a web-based system that provides customers direct access to view/update their trouble ticket, or by IVR. If the customer reports that the trouble has been fixed, the e-maintenance system automatically closes out the ticket. If the e-maintenance system is unable to communicate with a person, a message is left with an answering machine where an answering machine is available, and the ticket is placed in a queue to be closed out in 24 hours.

When the customer provides his/her approval to close out the ticket, an automatic closing program automatically closes out tickets that have been successfully "turned up", i.e., communicated, to the customer.

Figure 2:
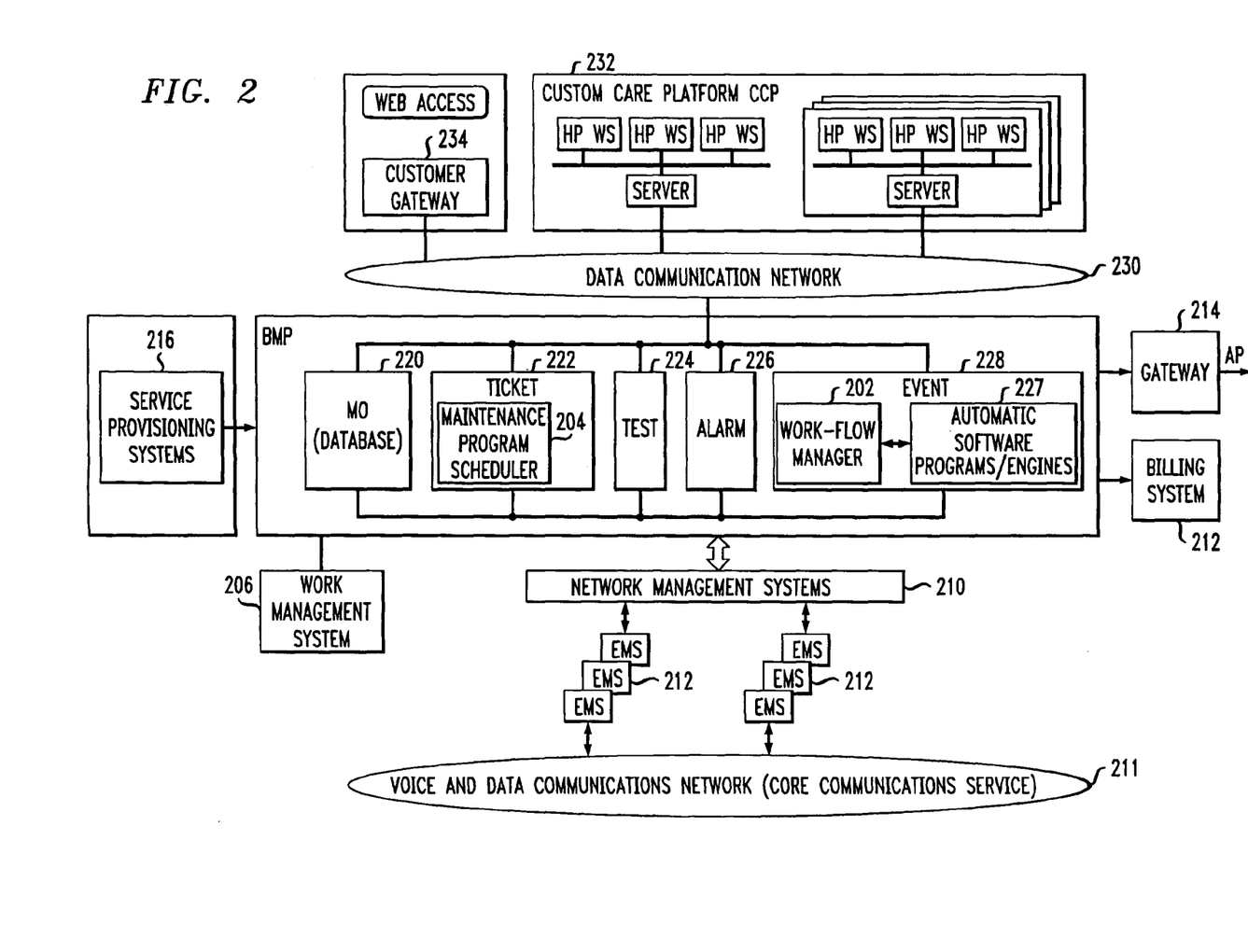
FIG. 2 is a block diagram of a communications network in which the present invention may be utilized.

FIG. 2 is a block diagram of a communications network in which the present invention may be utilized. The invention includes an automatic customer maintenance system for automatically providing infrastructure maintenance in response to a customer form/report/ticket in a communications network that includes a core communications (voice and data network 211) service and an Access Provider service (via Gateway 214). The automatic customer maintenance system includes a Work-Flow Manager 202 and a Maintenance Program Scheduler 204. The Work-Flow Manager 202 is a software program in the Event Unit 228. The Work-Flow Manager 202 triggers, for each customer form/report/ticket, the automatic software programs/engines 227 of a plurality of automatic software programs/engines in response to associated milestone events for the customer form/report/ticket. The automatic software programs/engines used for infrastructure maintenance typically include an automatic diagnosing program, an automatic linking program, an automatic notification program, an automatic referral program, an automatic preparation for clearing program, an automatic progress reporting program, an automatic verification program, an automatic customer notification program, and an automatic closing program. The automatic software programs/engines 227 for infrastructure maintenance are described in greater detail above and are typically stored in the Event Unit 228 in the Business Maintenance Platform 208.

The Maintenance Program Scheduler 204 is a unit in the Ticket Unit 222 and is coupled to the Work-Flow Manager 202 for invoking at least one predetermined maintenance software program/engine based upon predetermined criteria being met by the form/report/ticket.

Generally, the predetermined maintenance software programs for the maintenance program scheduler include an automatic progress reporting program and an automatic closing program, which are typically implemented at predetermined times. Failures in the core communications service are tracked using a customer gateway 234 for Web access that is coupled to a data communication network 230, which is coupled to the BMP 208. The customer form/report/ticket may be initiated by the client using Web access via a Customer Gateway 234 or alternatively by an agent in a Custom Care Platform 232 that is coupled to a data communication network 230 that delivers the customer form/report/ticket to the Business Maintenance Platform 208 for processing in accordance with at least the automatic software programs. The Business Maintenance Platform 208 may include: a Database 220, a Ticket Unit 222 for processing the customer form/report/ticket, a Test Unit 224 for testing a selected infrastructure portion of the communications network, an Alarm Unit 226 for recording problems that the system detects in the network, and an Event Unit 228 having a Work-Flow Manager and a plurality of computer programs/engines, wherein the Event Unit is used for monitoring events and initiating activities based on events.

The Business Maintenance Platform 208 may generally be coupled to a Data Communication Network 230, Service Provisioning Systems 216, a Work Management System 206, Network Management Systems 210, a Billing System 212, and a Gateway 214 that couples the BMP 208 to at least one Access Provider.

The Database 220 is coupled to the Work Management System 206, the Network Management Systems 210, a Billing System 212, a Service Provisioning System 216, an AP Gateway 214 and to a data communication network 230, wherein the Database is used for storing information on data circuits and customer information; the Maintenance Program Scheduler 204 located in the Ticket Unit 222, is coupled to the Work Management System 206, Network Management Systems 10, a Billing System 212, a Service Provisioning System 216, an AP Gateway 214 and to the data communication network 230, wherein the Maintenance Program Scheduler 204 automatically schedules the computer program/engine to perform maintenance actions in accordance with the initiating events that are detected by the Event Unit 228. The Ticket Unit 222 is coupled to the Work Management System 206, the Network Management Systems 210, a Billing System 212, a Service Provisioning System 216, an AP Gateway 214 and a data communication network 230, and is used for processing the customer form/report/ticket. The Test Unit 224 is coupled to the Work Management System 206, the Network Management Systems 210, a Billing System 212, a Service Provisioning System 216, an AP Gateway 214 and a data communication network 230, and is used for testing a selected infrastructure portion of the communications network. The Alarm Unit 226 is coupled to the Work Management System 206, the Network Management Systems 210, a Billing System 212, a Service Provisioning System 216, an AP Gateway 214 and a data communication network 230, and is used for recording problems that the system detects in the network. The Event Unit 228 includes a Work-Flow Manager 202 and a plurality of computer programs/engines, is coupled to the Work Management System 206, the Network Management Systems 210, a Billing System 212, a Service Provisioning System 216, an AP Gateway 214 and to a data communication network 230, and is used for monitoring events and initiating activities based on events.

Generally, the Business Maintenance Platform is coupled to a Customer Care Platform (CCP) 232 such that the customer form/report/ticket may be initiated by an agent in the Customer Care Platform upon being notified by the customer that a problem exists. The CCP 232 is coupled to the data communication network 230 that delivers the customer form/report/ticket to the Business Maintenance Platform 208 for utilizing the software maintenance programs described above.

To coordinate the software programs that make up the building blocks of the automatic customer maintenance system of the present invention, a Work-Flow Manager invokes the programs (Action Triggered) immediately after triggering events (Milestone Events) in accordance with a predetermined scheme. The predetermined scheme is set forth in the table below:

| Milestone Event | Action Triggered |
| --- | --- |
| Ticket Created | automatic diagnosing |
| | automatic linking |
| Diagnosing Completed | automatic notification |
| | automatic referral |
| | automatic preparation for clearing |
| | automatic progress reporting |
| Request to Close from the Access Provider | automatic verification |
| Automatic Verification Completed | automatic notification |
| | automatic preparation for clearing |
| Automatic Preparation for Clearing Completed | automatic customer notification |
| Customer OK to Close | automatic closing |

The Work-Flow Manager 202 includes logic for determining the "Next System's Activity" or Action Triggered after a particular Milestone Event occurs.

In addition to the Actions Triggered that are initiated by the Work-Flow Manager 202 in response to the Milestone Events, a Maintenance Program Scheduler 204 is used to invoke certain software programs at specific times. The Maintenance Program Scheduler 204 operates at a predetermined interval and scans the database for trouble tickets that meet predetermined criteria for the individual software programs. For example, the Maintenance Program Scheduler may initiate the automatic progress reporting program every 15 minutes and search for tickets wherein the customer is due a status report within 25 minutes, or may initiate the automatic closing program every hour every hour to search for tickets that have been communicated to the customer over a preceding 24 hours. Generally, any program may be triggered by the Work-Flow Manager or by the Scheduler.

Figure 3:
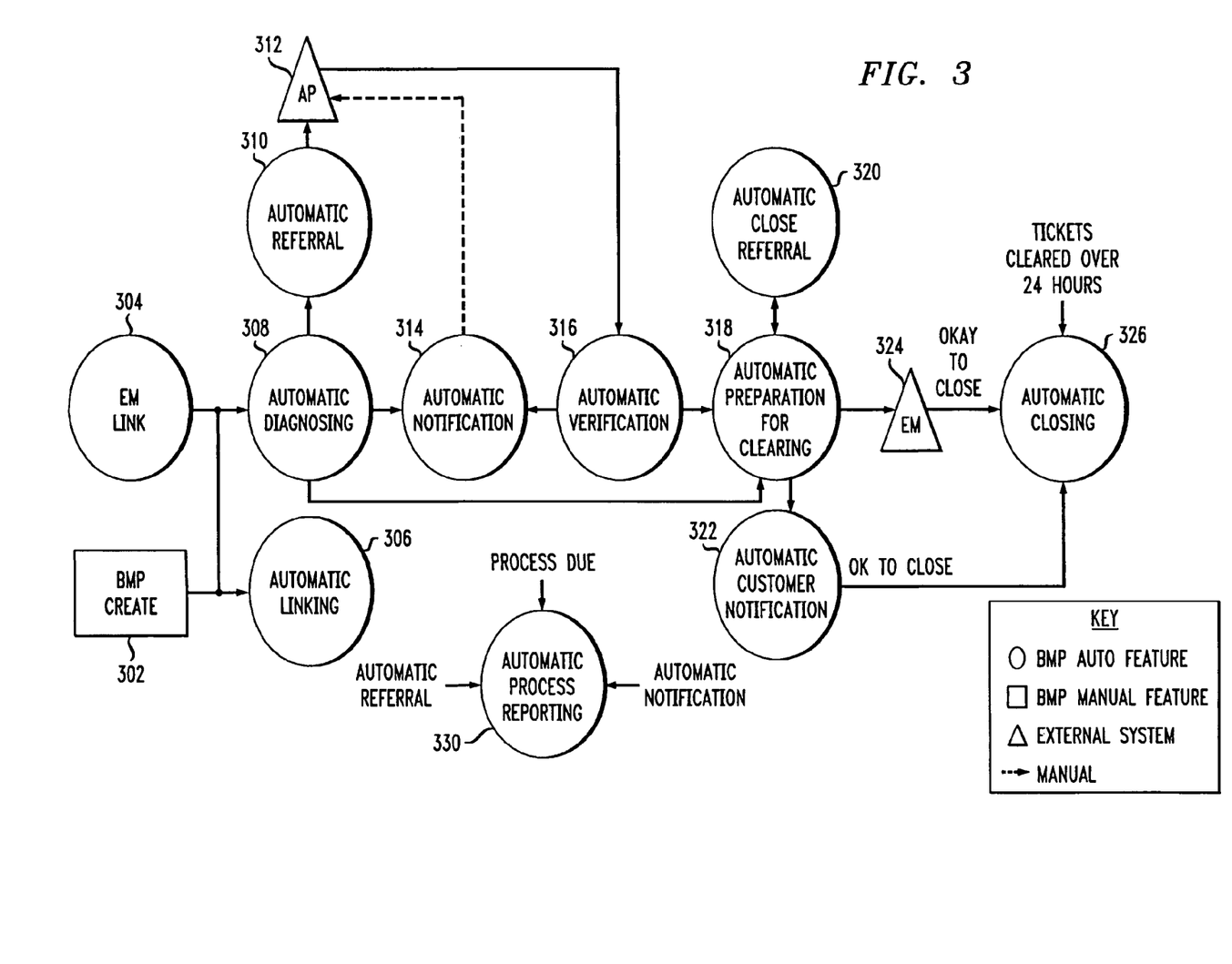
FIG. 3 is a flow chart of another embodiment of steps in accordance with the method of the present invention.

FIG. 3 is a flow chart of another embodiment of steps in accordance with the method of the present invention. Automatic features of the BMP are shown in circles, manual features of the BMP are shown in squares, and external systems are shown in triangular form. Manual actions are shown by dashed lines. First, a customer form/report/ticket concerning a circuit problem is prepared by an agent 302 of the CCP and sent to the BMP, or the customer sends an email (EM) 304 that includes the customer form/report/ticket to the BMP. When the customer form/report/ticket has been transmitted, the automatic linking program 306 determines whether the problem reported has been caused by a higher level facility/equipment or is a lower level circuit problem. Where the problem relates to a higher level facility/equipment, a second ticket is automatically prepared for the higher level facility/equipment and the original ticket and the second ticket are correlated so that when the second ticket is updated, the original ticket is also updated. The automatic diagnosing program 308 diagnoses the problem as described above and, where the problem has been fixed, the automatic preparation for clearing program 318 is initiated. Where the problem exists in the Access Provider's portion of the circuit, the automatic referral program 310 automatically sends an electronic referral to the Access Provider. Where the automatic diagnose program 308 determines that manual intervention by a maintenance technician is needed, the automatic notification program 314 sends (not shown) an electronic message to the technician alerting him to the need for repair. Upon the AP's or the technician's completion of the repair, a message is sent to the automatic verification program 316. Then the automatic verification program 316 runs tests and performs alarm checks to determine if the problem has been repaired. Next, the automatic preparation for clearing program 318 pre-populates the clearance information and analysis codes on the ticket to indicate that the problem has been repaired. Where desired, an automatic closing referral program 320 may send an electronic message to the Access Provider to indicate that the public switched network service accepts closure after verification that the circuit is working correctly. The automatic customer notification program 322 then provides an update to the customer by the interactive voice response system indicating that the problem is fixed; and if the customer confirms that the problem is fixed, the automatic closing program 326 automatically closes the ticket. Following the automatic preparation for clearing program execution, alternatively, the BMP sends a message to the customer that the customer may view the status of the ticket on the EMS (Electronic Maintenance System—the customer's access to the web gateway). Where the problem is fixed, the automatic closing program 326 closes out the ticket. As indicated in FIG. 3, the automatic progress reporting program 330 may be implemented when desired such as at predetermined times, upon initiation by the automatic referral program, upon initiation by the automatic notification program, or by an indication that a report on progress due is needed.

Although the present invention has been described in relation to particular preferred embodiments thereof, many variations, equivalents, modifications and other uses will become apparent to those skilled in the art. The present invention is intended to cover any variations, equivalents, modifications and other such uses that follow the principles of the invention, including such departures from the present disclosure as come within known and customary practice within the art to which the invention pertains. It is preferred, therefore, that the present invention be limited not by the specific disclosure herein, but only by the appended claims, and that the present invention shall include any variations, equivalents, modifications and other such uses that follow the principles of the invention, including such departures from the present disclosure as come within known and customary practice within the art to which the invention pertains.

What is claimed is:

1. An automatic customer maintenance system for automatically providing infrastructure maintenance in response to a customer form/report/ticket in a communications network that includes a core communications service and an Access Provider service, comprising:

a Work-Flow Manager, arranged to automatically trigger, for each customer form/report/ticket, at least one automatic diagnosis software program from a plurality of automatic diagnosis software programs without human intervention for automatically generating a ticket/customer repair request regarding a problem and diagnosing the problem by using the at least one automatic diagnosis software program and using an automatic linking program for automatically linking and correlating the customer form/report/ticket with another ticket for problem occurring in a higher level facility/equipment; and a Maintenance Program Scheduler, coupled to the Work-Flow Manager, for invoking at least one predetermined maintenance software program based upon predetermined criteria being met by the form/report/ticket, and the results of the at least one automatic diagnosis software program, for automatically testing to determine whether the problem has been fixed, automatically generating clearance information and analysis codes on the ticket, automatically notifying the customer that the system has repaired the problem and automatically closing out the ticket/customer repair request upon successful repair of the problem, without human intervention.

2. The automatic customer maintenance system of claim 1 wherein the plurality of automatic diagnosis software programs include:

an automatic diagnosing program for providing automatic diagnosis;

an automatic linking program for automatically linking the customer with an area to solve a problem;

an automatic notification program for automatically notifying a maintenance technician when the problem requires further analysis;

an automatic referral program for automatically referring the problem to the Access Provider service via a first gateway;

an automatic preparation for clearance program for automatically populating clearance information and analysis codes on the ticket based on a diagnosis conclusion sent by the Access Provider service;

an automatic progress reporting program for automatically determining when a status is owed to the customer;

an automatic verification program for automatically verifying if the problem has been fixed;

an automatic customer notification program for automatically conveying clearance information for the customer; and an automatic closing program for automatically checking for tickets that have been conveyed to the customer.

3. The automatic customer maintenance system of claim 1 wherein the at least one predetermined maintenance software program for the maintenance program scheduler include:

an automatic progress reporting program; and an automatic closing program.

4. The automatic customer maintenance system of claim 1 wherein the Access Provider service is implemented using a second gateway for access that is coupled to a data communication network of the communications network.

5. The automatic customer maintenance system of claim 1 wherein the customer form/report/ticket is initiated by an agent in a Customer Care Platform that is coupled to a data communication network that delivers the customer form/report/ticket to a Business Maintenance Platform for processing without human intervention in accordance with at least the automatic software programs.

6. The automatic customer maintenance system of claim 5 wherein the Business Maintenance Platform includes:
   a Database for storing circuit and customer information;
   a Ticket Unit for processing the customer form/report/ticket;
   a Test Unit for testing a selected infrastructure portion of the communications network;
   an Alarm Unit for recording problems that the system detects in the network; and
   an Event Unit having a Work-Flow Manager and a plurality of computer programs/engines, wherein the Event Unit is used for monitoring events and initiating activities based on events.

7. The automatic customer maintenance system of claim 1 wherein the Business Maintenance Platform is coupled in parallel to a Data Communication Network, Service Provisioning Systems, a Work Management System, Network Management Systems, a Billing System, and a Gateway.

8. A method for automatically providing, without human intervention, infrastructure maintenance in response to a customer form/report/ticket in a communication network that includes a core communications service and an Access Provider service, comprising the steps of:
   automatically generating a ticket/customer repair request regarding a problem;
   automatically diagnosing the problem by using at least one automatic diagnosis software program and using an automatic linking program for automatically linking and correlating the customer form/report/ticket with another ticket for problem occurring in a higher level facility/equipment;
   automatically testing to determine whether the problem has been fixed;
   automatically generating clearance information and analysis codes on the ticket;
   automatically notifying the customer that the system has repaired the problem; and
   automatically closing out the ticket/customer repair request upon successful repair of the problem.

9. The method of claim 8 wherein generating a ticket/customer repair request regarding a problem is accomplished by a customer and the ticket is transmitted to a Business Maintenance Platform for automatic infrastructure maintenance processing.

10. The method of claim 8 wherein generating a ticket/customer repair request regarding a problem is accomplished by an agent of a Customer Care Platform and transmitted to a Business Maintenance Platform for automatic infrastructure maintenance processing.

11. The method of claim 8 wherein testing to determine whether the problem has been fixed is accomplished by an automatic verification program for automatically verifying if the problem has been fixed.

12. The method of claim 8 wherein generating clearance and analysis codes is accomplished by an automatic preparation for clearance program for automatically populating clearance information and analysis codes on the ticket based on a diagnosis conclusion sent by the Access Provider service.

13. The method of claim 8 wherein notifying the customer that the system has repaired the problem is accomplished by an automatic customer notification program for automatically conveying clearance information for the customer that displays a circuit trouble description to the customer via e-maintenance, a web-based system that provides customers direct access to view/update their trouble ticket, and by an Interactive Voice Response system.

14. The method of claim 8 wherein closing out the ticket/repair request upon successful repair of the problem is accomplished by an automatic closing program for automatically checking for tickets that have been conveyed to the customer.

15. The method of claim 8 wherein an automatic notification program for automatically notifying a maintenance technician when the problem requires further analysis is utilized when a trouble ticket is sent to a maintenance technician as soon as the problem is diagnosed as a telephone service/core communications service problem requires manual intervention.

16. The method of claim 8 wherein an automatic progress reporting program for automatically determining when a status is owed to the customer is utilized to implement an Interactive Voice Response system that automatically phones the customer periodically and informs him/her/an answering machine of the current status of his/her ticket.

17. The method of claim 8 wherein an automatic verification program for automatically verifying if the problem has been fixed is utilized to run tests and perform alarm checks to determine if an Access Provider has fixed the problem that is being reported as cleared or a manual intervention has occurred to solve the problem.

18. A method for automatically providing infrastructure maintenance in response to a customer form/report/ticket in a communications network that includes a core communications service and an Access Provider service, comprising the steps of utilizing, without human intervention, software programs for automatically:
   preparing, by one of a customer and an agent, a customer form/report/ticket concerning a circuit problem and sending the customer form/report/ticket to a Business Maintenance Platform;
   determining whether the circuit problem reported ahs been caused by a higher level facility/equipment/lower level circuit problem, and where the circuit problem relates to a higher level facility/equipment, automatically preparing a second ticket for the higher level facility/equipment and correlating the customer form/report/ticket and the second ticket with respect to updates;
   diagnosing the circuit problem and, where the circuit problem has been fixed, initiating clearing of the ticket, and where the problem exists in the Access Provider's portion of the circuit, automatically sending an electronic referral to an Access Provider, and determining that manual intervention by a maintenance technician is needed, sending an electronic message to the maintenance technician alerting the maintenance technician to the need for repair;
   sending, upon the Access Provider's/the maintenance technician's completion of the repair, a message requesting verification that the problem has been fixed;
   testing and performing alarm checks to determine if the circuit problem has been repaired;
   when the circuit problem has been repaired, pre-populating clearance information and analysis codes on the customer form/report/ticket to indicate that the circuit problem has been repaired;
   providing an update to the customer, by one of an interactive voice response system and an email, indicating that the problem is fixed; and when the customer confirms that the circuit problem is fixed, closing out the ticket.

19. The method of claim 18 wherein, following clearing, alternatively, an email (EM) is sent automatically to update the customer; and when the customer indicates that the problem is fixed, automatically closing out the customer form/report/ticket.

20. The method of claim 18 including automatically sending an electronic message to the Access Provider to indicate that the public switched network service accepts closure after verification that the circuit is working correctly.

21. The method of claim 18 including automatically reporting upon one of the following: a predetermined time having elapsed, an initiation by the automatic referral, an initiation by the automatic notification and an indication that a report on progress due is needed.

* * * * *